United States Patent
Kang et al.

[11] Patent Number: 6,152,471
[45] Date of Patent: Nov. 28, 2000

[54] VARIABLE PEDAL DRIVING DEVICE OF BICYCLE

[76] Inventors: Byung Nam Kang; Jong suk Kim, both of 545 Bansong-Dong, Haeundae-ku, Pusan; Hye Jong Park, 1615 Allak-Dong, Dongrae-ku, Pusan, all of Rep. of Korea

[21] Appl. No.: 09/142,372

[22] PCT Filed: Dec. 31, 1997

[86] PCT No.: PCT/KR97/00284

§ 371 Date: Sep. 4, 1998

§ 102(e) Date: Sep. 4, 1998

[87] PCT Pub. No.: WO98/29295

PCT Pub. Date: Jul. 9, 1998

[30] Foreign Application Priority Data

Jan. 4, 1997 [KR] Rep. of Korea ........................ 97-721
Oct. 30, 1997 [KR] Rep. of Korea ..................... 97-58360

[51] Int. Cl.$^7$ .............................. B62M 1/02; G05G 1/14
[52] U.S. Cl. ...................... 280/261; 280/259; 74/594.3
[58] Field of Search ................................. 280/259, 260, 280/261, 262; 74/594.3, 594.1, 594.2, 594.4

[56] References Cited

U.S. PATENT DOCUMENTS

| | | | |
|---|---|---|---|
| 597,098 | 1/1898 | Bullis | 74/594.3 |
| 4,446,754 | 5/1984 | Chattin | 74/594.3 |
| 4,519,271 | 5/1985 | Chattin | 74/594.3 |
| 4,807,491 | 2/1989 | Stuckenbrok | 74/594.3 |
| 4,960,013 | 10/1990 | Sander | 74/594.3 |
| 5,095,772 | 3/1992 | Fortson | 74/594.3 |
| 5,172,926 | 12/1992 | Mannino | 280/252 |
| 5,207,119 | 5/1993 | Garneau | 74/594.3 |
| 5,261,294 | 11/1993 | Ticer et al. | 74/594.3 |

FOREIGN PATENT DOCUMENTS

| | | | |
|---|---|---|---|
| 450583A1 | 10/1991 | European Pat. Off. | 280/594.3 |
| 929797 | 6/1946 | France | 74/594.3 |
| 406092284 | 4/1994 | Japan | 74/594.3 |
| 10410 | of 1894 | United Kingdom | 74/594.3 |
| 721 | of 1896 | United Kingdom | 74/594.3 |

*Primary Examiner*—J. J. Swann
*Assistant Examiner*—F. Zeender
*Attorney, Agent, or Firm*—Birch, Stewart, Kolasch & Birch, LLP

[57] ABSTRACT

A variable pedal driving device for a bicycle, the device allowing the bicycle pedals to slide along crankshafts during operation of the device. Each pedal is coupled to a slide pipe slidably mounted on a crankshaft. The slide pipe is in turn connected to an eccentric member mounted on the main shaft of the driving device. When a pedal is driven in a forward direction, the eccentric member causes the pedal to extend out to a maximum distance from the main shaft, for more efficient driving of the bicycle.

16 Claims, 12 Drawing Sheets

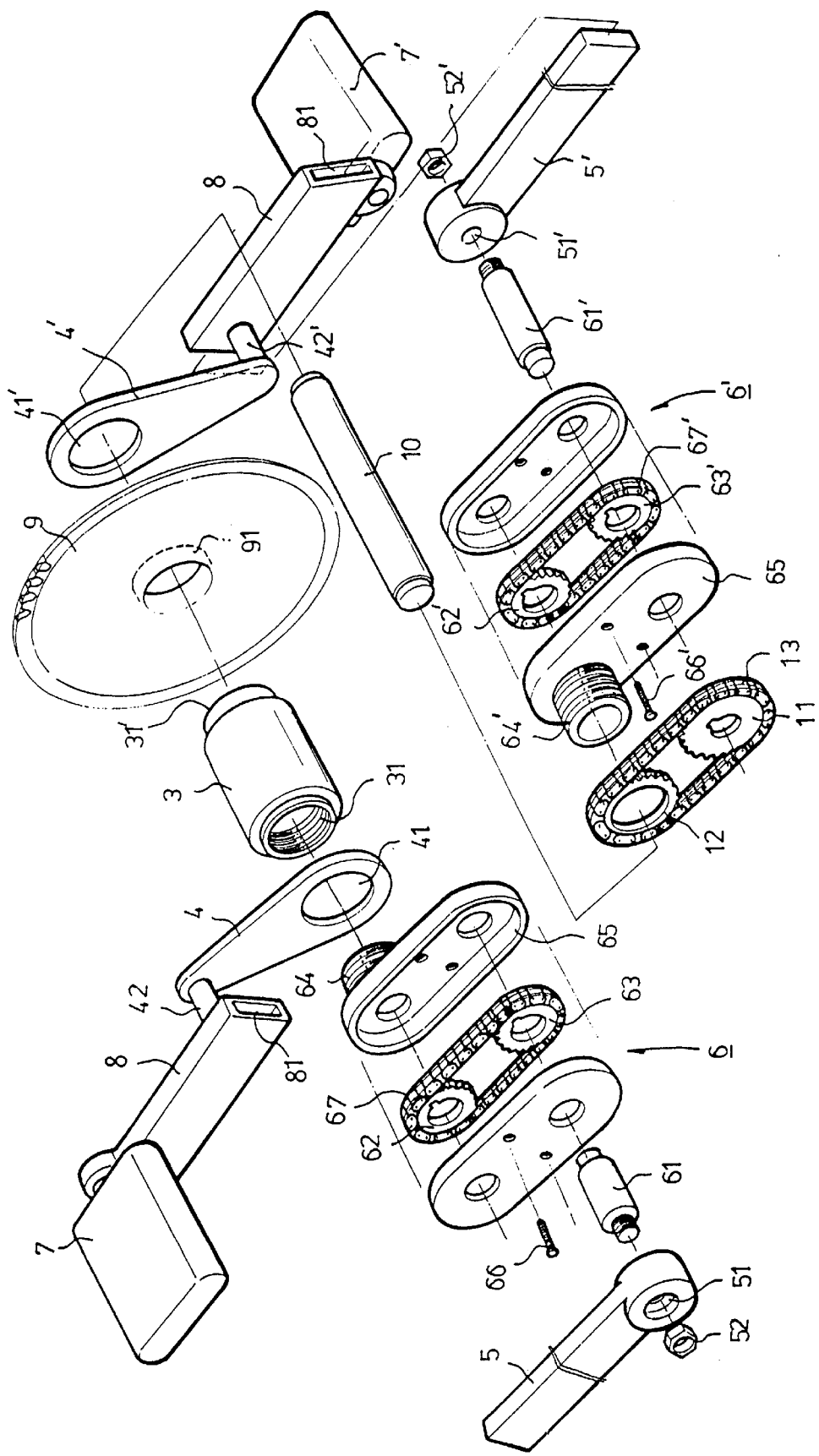

VARIABLE PEDAL DRIVING DEVICE OF BICYCLE

This application is the national phase under 35 U.S.C. §371 of prior PCT International Application No. PCT/KR97/00284 which has an International filing date of Dec. 31, 1997 which designated the United States of America, the entire contents of which are hereby incorporated by reference.

TECHNICAL FIELD

The present invention relates to a bicycle, and more particularly, to a variable pedal driving device of bicycle which can extend, upon running, a distance between crankshafts which transmit a rotating force of pedals to a rear wheel and the pedals to thereby obtain a maximum driving energy, at the expense of a minimum physical energy consumption.

BACKGROUND ART

Generally, an existing bicycle has been designed to have a fixed distance between crankshafts and pedals and therefore, its running force depends only upon a driving force of the pedals assembled with the crankshafts. Under such the driving structure of the bicycle, since the rotating force of the pedals is exerted within a predetermined rotary radius, the bicycle needs lots of driving energy upon running up a climbing road. To improve this problem as well as to obtain an effective driving energy, it is well known that a change gear may be installed to optimize the running force of the bicycle.

However, although the change gear has been mounted, the pedals, which are a power source of the running force of the bicycle, maintains a constant rotary radius to thereby provide the same driving energy amount. It can be therefore appreciated that installation of the change gear fails to provide a desired driving force. Due to such the failure, there occurs a need to vary the restrictive rotary radius of pedals to thereby optimize the running force of the bicycle in order to minimize driving energy consumption.

SUMMARY OF THE INVENTION

An object of the present invention is to provide a variable pedal driving device of a bicycle which can improve a structural feature of crankshafts on which pedals are installed to enlarge a rotary radius of the pedals, upon running, thus to obtain an optimum driving energy and to minimize physical energy consumption, whereby when the bicycle runs up a climbing road or a long distance, it causes minimum fatigue to a user.

To achieve this and other objects according to the present invention, a variable pedal driving device of a bicycle includes: first and second power transmission units installed on both sides of a main shaft mounted on a shaft pipe of a shaft hole of a bicycle frame; first and second slide pipes associated on first and second fixed shafts of first and second rotary levers rotatably mounted on both ends of the shaft pipe; first and second pedals installed on front ends of the first and second slide pipes; and first and second crankshafts mounted on first and second rotary shafts of the power transmission units and slidingly associated on first and second slide holes of the first and second slide pipes, the first and second rotary shafts of the crankshafts and the main shaft being engaged with each other and the second rotary shaft of the second power transmission unit being engaged with a chain sprocket connected by means of a chain with a rear wheel.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein:

FIG. 4 is an exploded perspective view of FIG. 1;

BEST MODE FOR CARRYING OUT THE INVENTION

Figure 1:
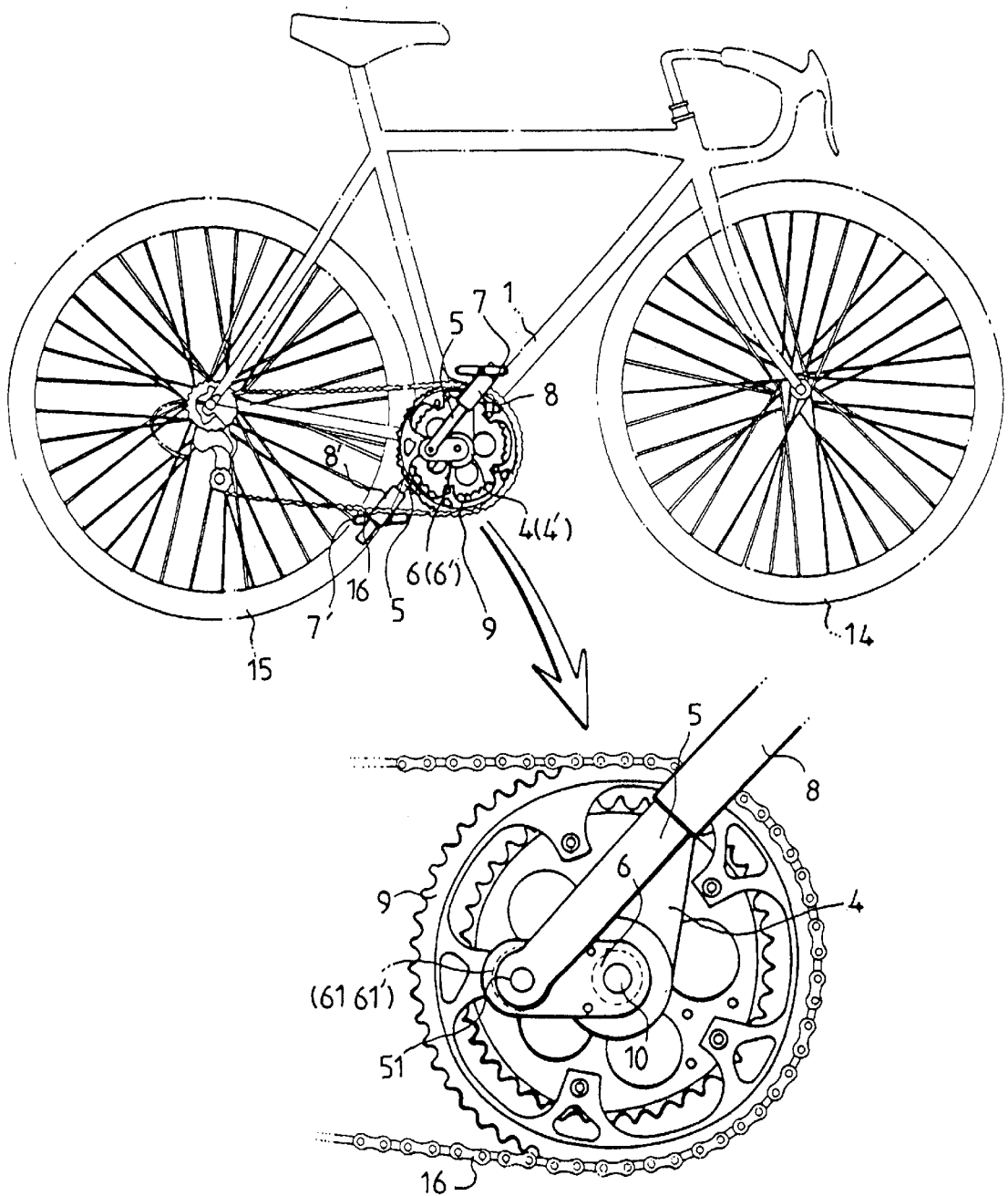
FIG. 1 is a side view illustrating a variable pedal driving device constructed according to a first embodiment of the present invention.
Figure 2:
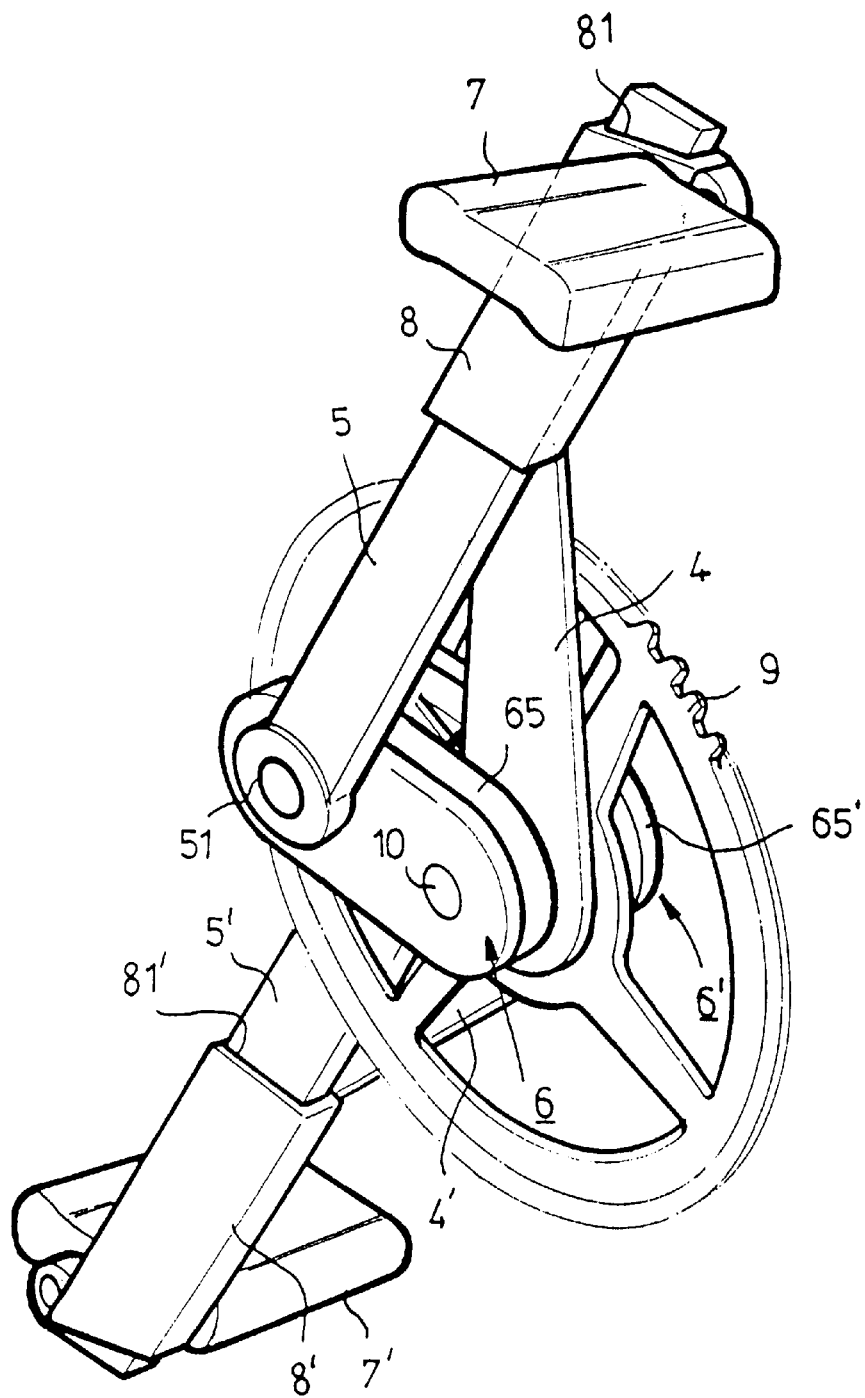
FIG. 2 is a perspective view illustrating main parts of FIG. 1.
Figure 3:
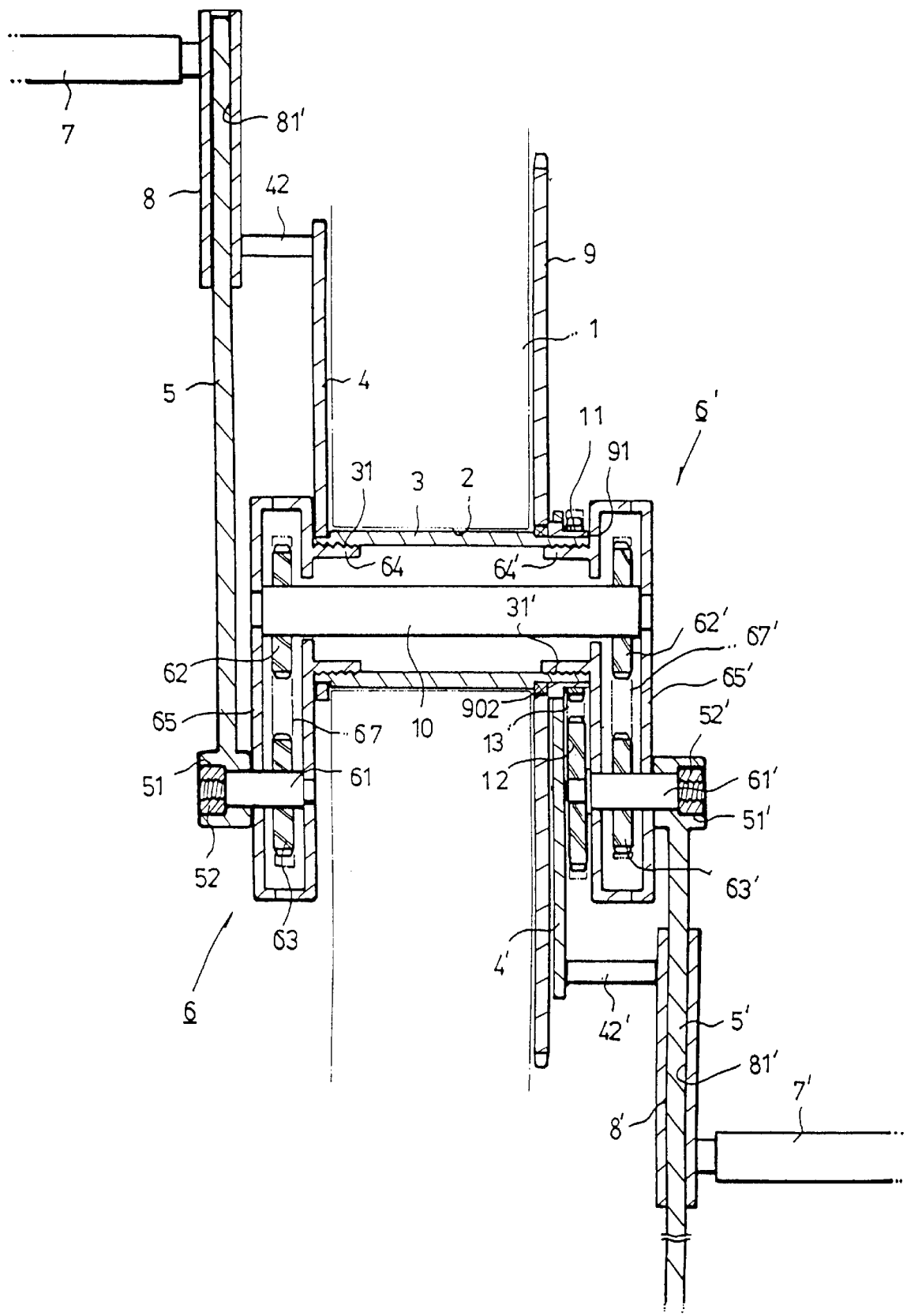
FIG. 3 is a sectional view of FIG. 1.
Figure 5A:
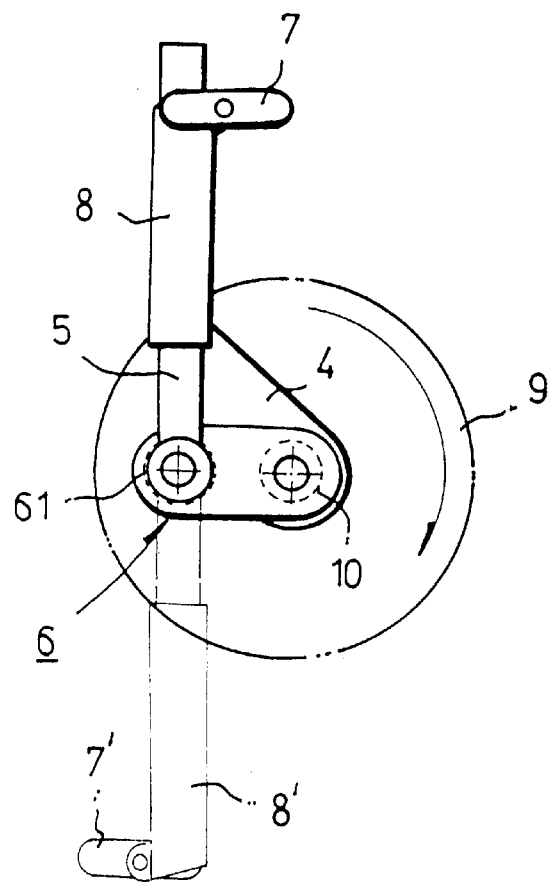
FIGS. 5A to 5C are side views illustrating operational states of FIG. 1.
Figure 5B:
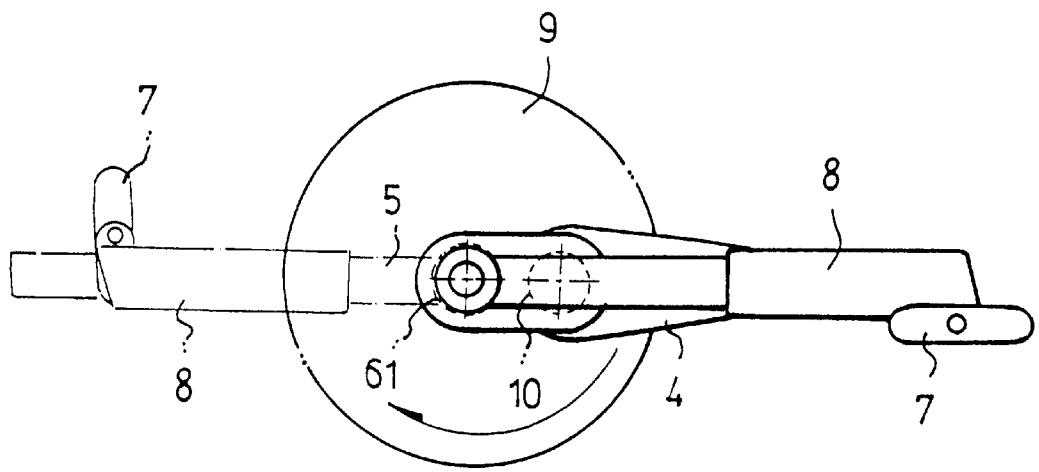
Figure 5C:
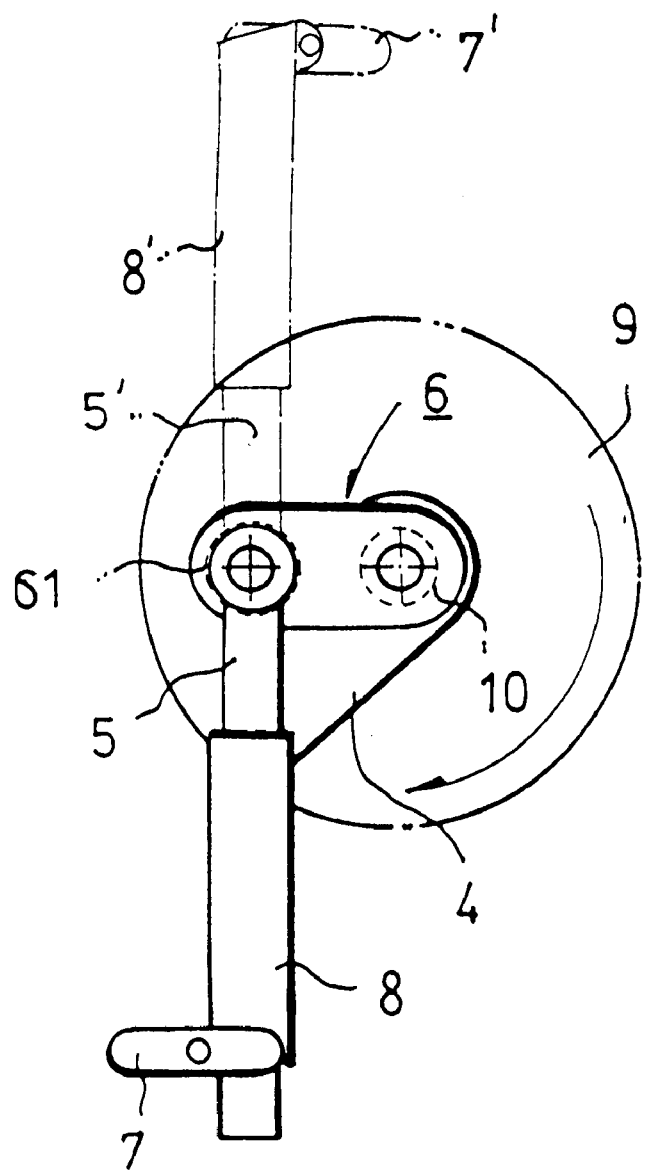

FIG. 1 is a side view illustrating a variable pedal driving device constructed according to a first embodiment of the present invention, FIG. 2 is a perspective view illustrating main parts of FIG. 1, and FIG. 3 is a sectional view of FIG. 1. Furthermore, FIG. 4 is an exploded perspective view of FIG. 1, and FIGS. 5A to 5C are side views illustrating operational states of FIG. 1.

The present invention is characterized by that the distance between crankshaft 5 and 5' and pedals 7 and 7' which are each installed opposed at an angle of 180° to each other on a shaft hole 2 of a bicycle body's frame 1 is adapted to be varied and extended during running.

Now, an explanation on the construction of a variable pedal driving device constructed according to a first embodiment of the present invention will be in detail discussed hereinafter.

A shaft pipe 3 is assembled on the shaft hole 2 of the frame 1 and coupling holes 41 and 41' of rotary levers 4 and 4' are rotatably assembled on both sides of the shaft pipe 3. A main shaft 10 is installed on the inner side of the shaft pipe 3 and power transmission units 6 and 6' and crankshafts 5 and 5' are respectively installed on the both sides of the main shaft 10.

The rotary levers 4 and 4' and the crankshafts 5 and 5' on both sides of the shaft pipe 3 are installed opposed to each other and the power transmission units 6 and 6' between the rotary levers 4 and 4' and the crankshafts 5 and 5' are under the same structure.

On either ends of the main shaft 10 installed on the inner side of the shaft pipe 3, differential tooth wheels 63 and 63' of the power transmission units 6 and 6' are installed via the coupling holes 41 and 41'. Since each of the power transmission units 6 and 6' takes a separatable shape, cases 65 and 65' are designed to be separated from each other by means of assembling bolts 66 and 66'. The differential tooth wheels 63 and 63' installed on the main shaft 10 and driving tooth wheels 62 and 62' are installed on the interior of the power transmission units 6 and 6'. In this case, the differential tooth wheels 63 and 63' and the driving tooth wheels 62 and 62' are each connected to each other by means of chains 67 and 67'.

The driving tooth wheels 62 and 62' are installed on rotary shafts 61 and 61' of the cases 65 and 65', and the crankshafts 5 and 5' are fixedly assembled on the one ends of the rotary shafts 61 and 61' by means of fixing nuts 52 and 52'. Slide pipes 8 and 8' on which pedals 7 and 7' are mounted are assembled on fixed shafts 42 and 42' installed on the front sides of the rotary levers 4 and 4', and the crankshafts 5 and 5' are inserted into slide holes 81 and 81' of the slide pipes 8 and 8'.

Meanwhile, a coupling pipe 91 is formed on one side of the shaft pipe 3, and a chain sprocket 9, which is connected by means of a chain 17 with a rear wheel 15, is rotatably installed as a unitary body on the coupling pipe 91. A rotary tooth wheel 12 is fixedly assembled on the chain sprocket 9, which is connected by means of a chain 13 with a driven tooth wheel 11 of the rotary shaft 61' having the differential tooth wheel 63' of the one side case 65'.

The power transmission units 6 and 6' may be welded to be assembled on the shaft pipe 3 of the shaft hole 2 of the frame 1, but to be easily separated and/or assembled, form male screw pipes 64 and 64' protrudedly toward the interior of the cases 65 and 65'. Thus, the male screw pipes 64 and 64' are screw-assembled with female screws 31 and 31' of the shaft pipe 3 by passing through the coupling holes 41 and 41' of the rotary levers 4 and 4' and the coupling pipes 91 of the chain sprocket 9.

In the power transmission units 6 and 6' the rotary shafts 61 and 61' on which the crankshafts 5 and 5' are installed are disposed on the rear wheel 15, such that when the pedals 7 and 7' assembled on the slide pipes 8 and 8' are driven in a forward direction, the crankshafts 5 and 5' which are inserted into the slide holes 81 and 81' of the slide pipes 8 and 8' are slided. As a result, the distance between the rotary shafts 61 and 61' and the pedals 7 and 7' is extended at its maximum. On the other hand, when the pedals 7 and 7' are driven to the rear wheel 16, the length of the crankshafts 5 and 5' is reduced to its original length.

Figure 6:
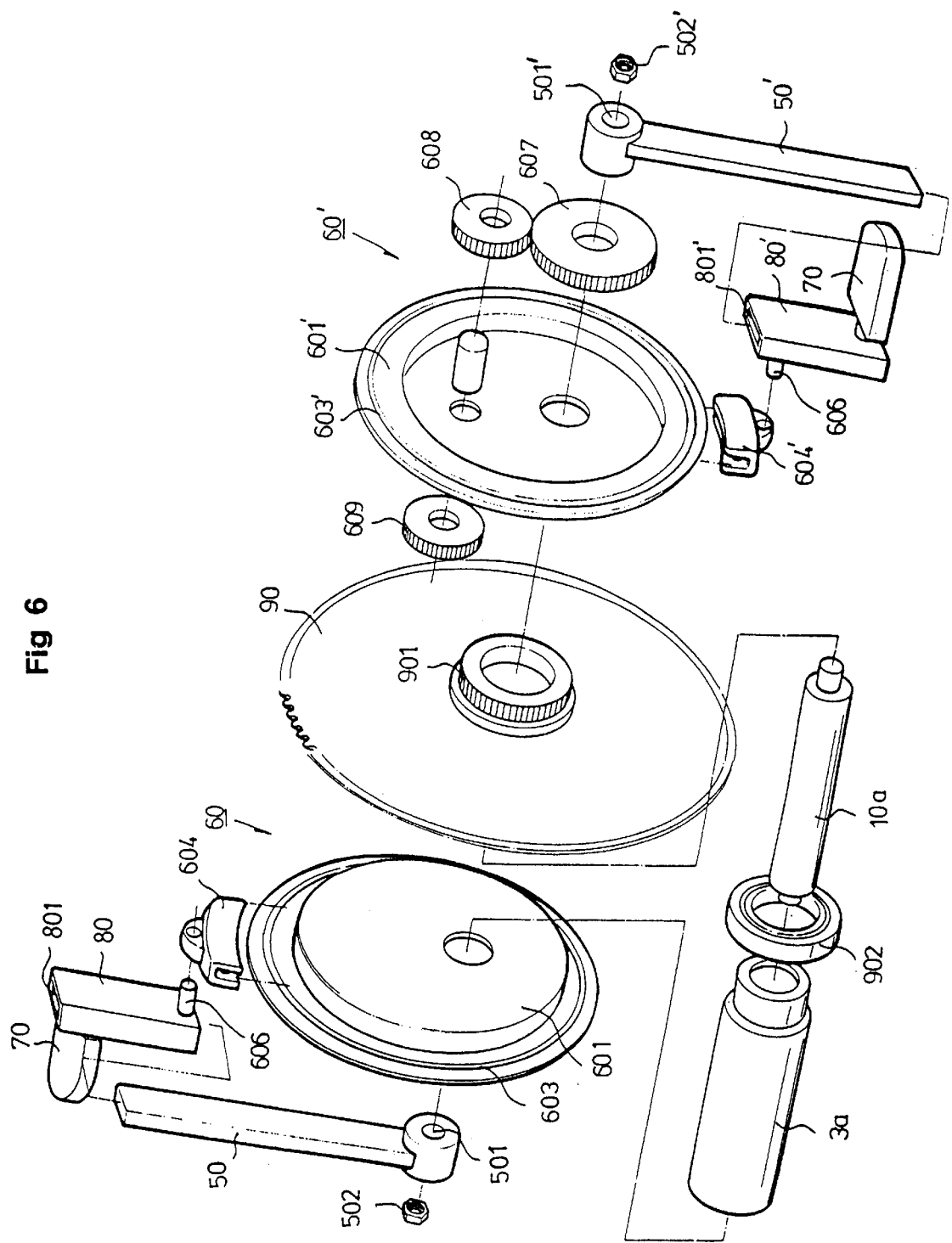
FIG. 6 is an exploded perspective view illustrating a variable pedal driving device constructed according to a second embodiment of the present invention.
Figure 7:
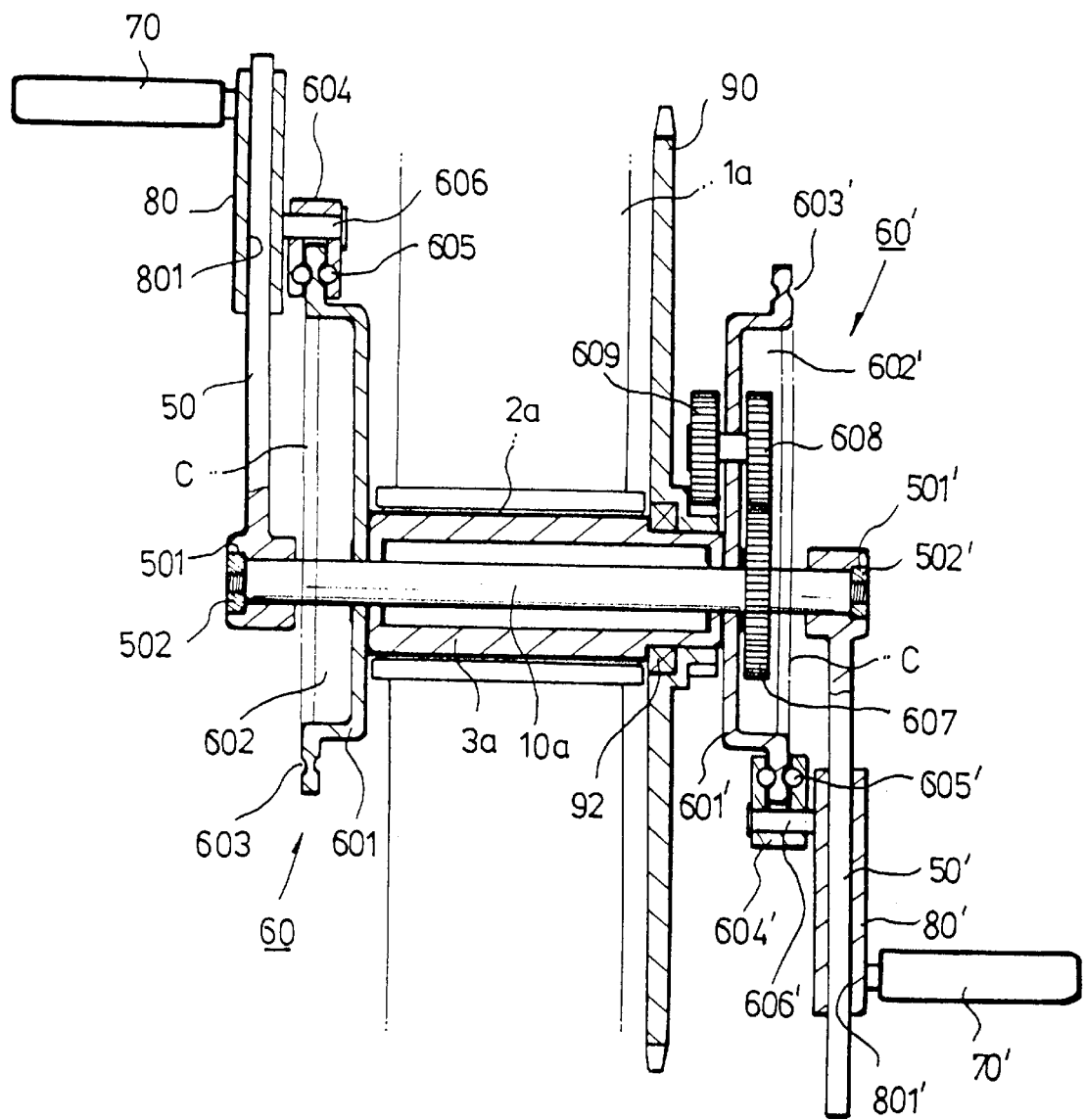
FIG. 7 is a sectional view illustrating an assembling state of FIG. 6.
Figure 8A:
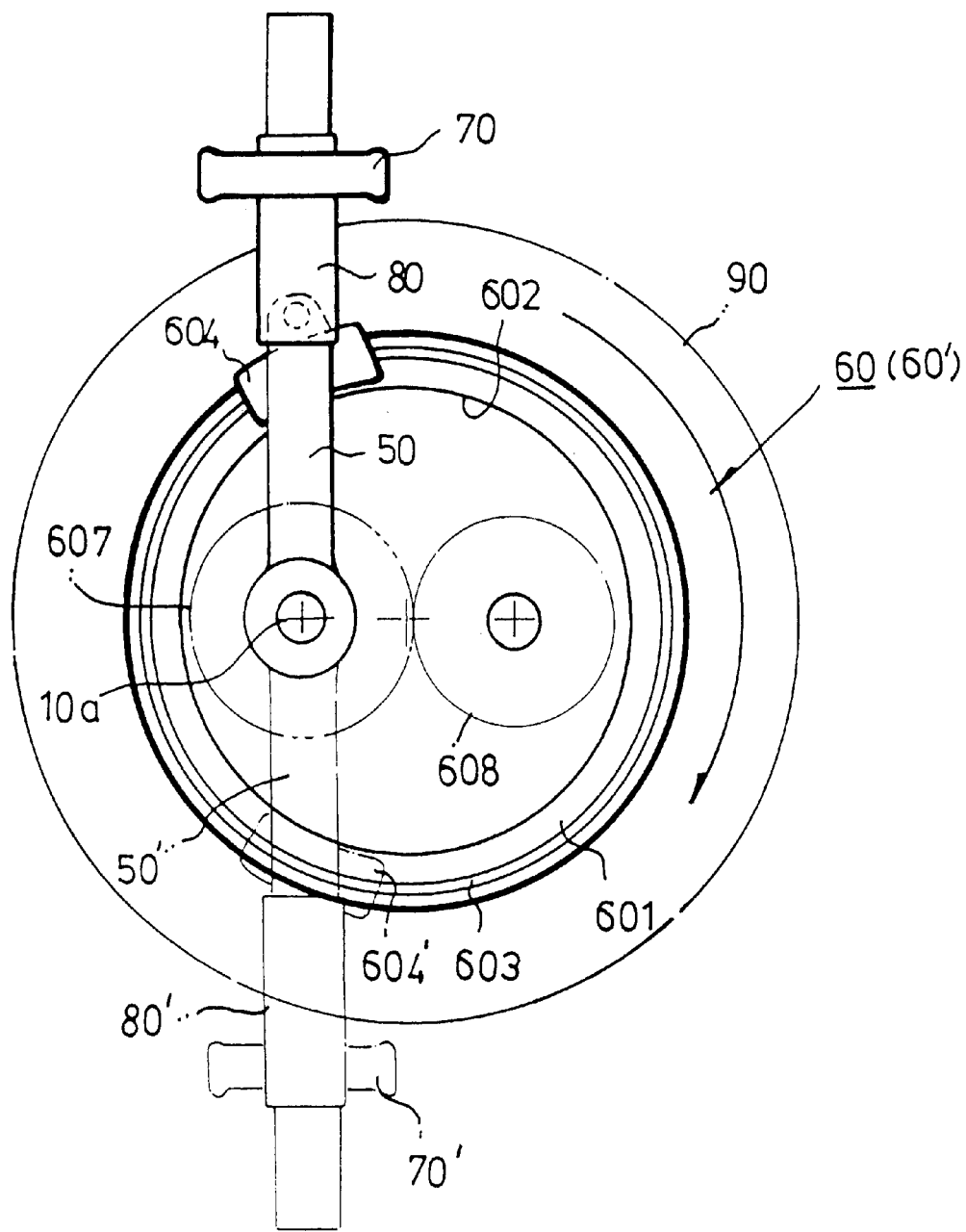
FIGS. 8A to 8C are side views illustrating operational states of FIG. 6.
Figure 8B:
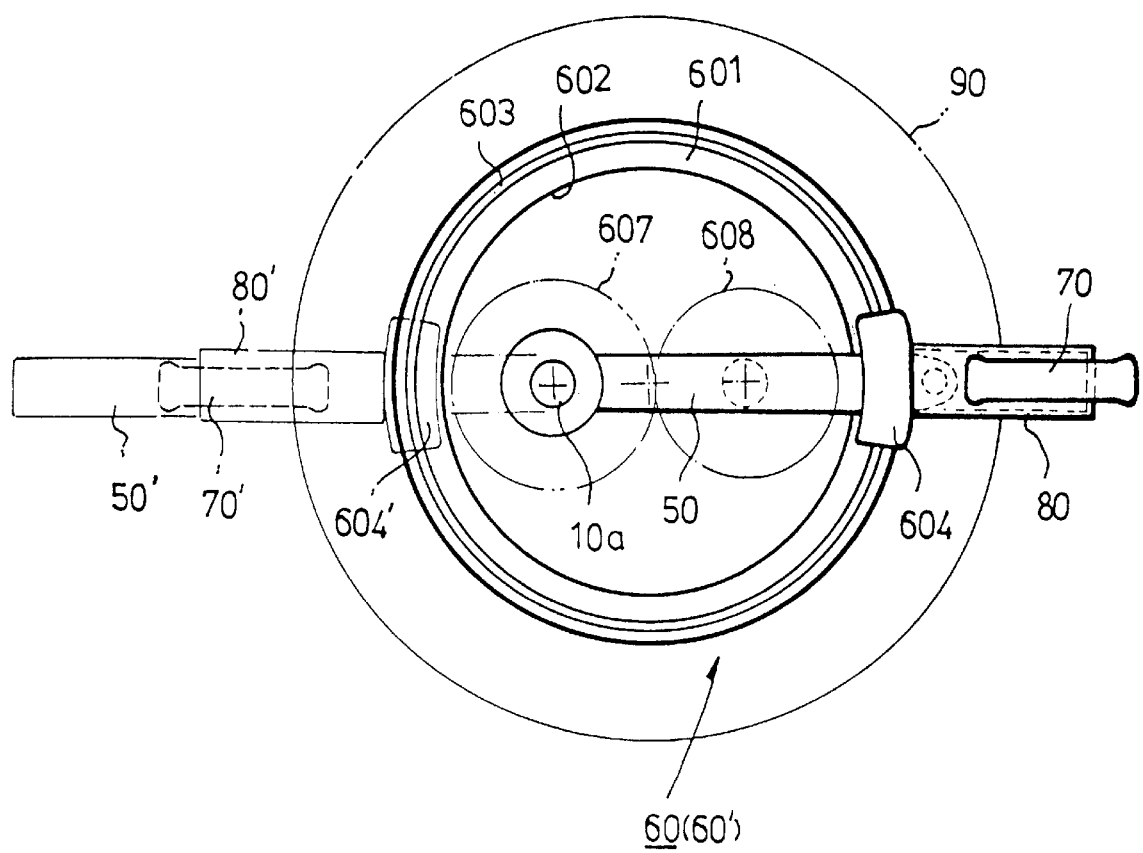
Figure 8C:
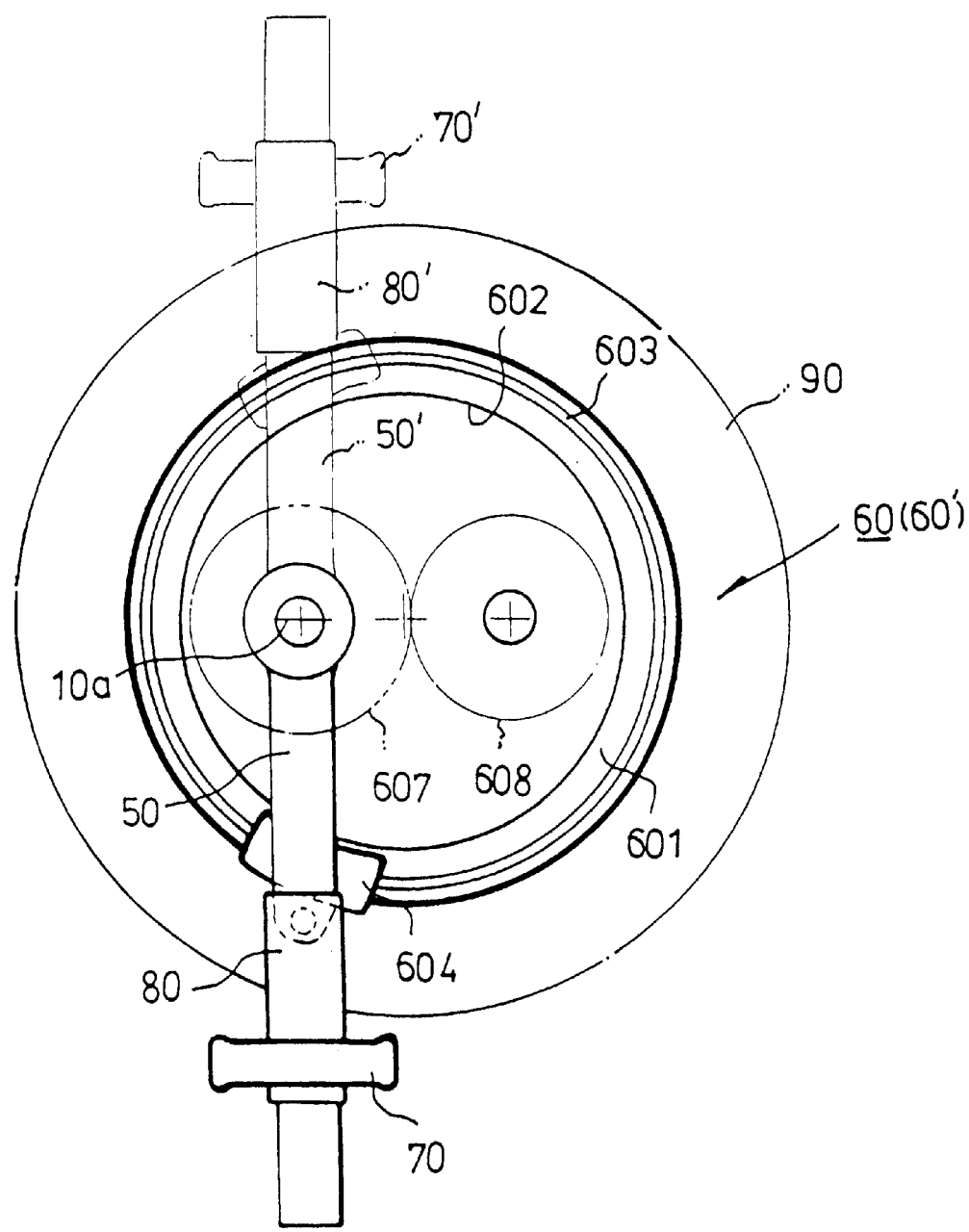

FIG. 6 is an exploded perspective view illustrating a variable pedal driving device constructed according to a second embodiment of the present invention, FIG. 7 is a sectional view illustrating an assembling state of FIG. 6, and FIGS. 8A to 8C are side views illustrating operational states of FIG. 6.

Power transmission units 60 and 60' and crankshafts 50 and 50' are respectively installed on the both sides of a main shaft 10a which is installed on the inner side of a shaft pipe 3a on a shaft hole 2 of a frame 1.

In the power transmission units 60 and 60' circular disks 601 and 601' on the main shaft 10a at the outside of the shaft pipe 3a are eccentrically installed on the rear wheel 15, and guide reentrant holes 603 and 603' are formed on the circular disks 601 and 601', on which guide members 604 and 604' having ball bearings 605 and 605' installed on the interior thereof are slidingly assembled. Slide pipes 80 and 80' having pedals 70 and 70' installed on the front sides thereof are assembled on hinge shafts 606 and 606' of the guide members 604 and 604'.

The crankshafts 50 and 50', which are fixedly assembled on the both ends of the main shaft 10a, are slidingly inserted into the slide holes 801 and 801' of the slide pipes 80 and 80'. Shaft holes 501 and 501' of the crankshafts 50 and 50' are inserted on the both ends of the main shaft 10a, such that the crankshafts 50 and 50' are fixedly assembled on the main shaft 10a by means of fixing nuts 502 and 502'.

Reentrant portions 602 and 602' are formed on the circular disks 601 and 601' and a driving tooth wheel 607 is installed on the main shaft 10a of the reentrant portions 602 and 602' and is engaged with a differential tooth wheel 608 on the one side thereof. A driven tooth wheel 609 on a coaxial line of the inside of the circular disk 601' is engaged with the differential tooth wheel 608, and the driven tooth wheel 609 is engaged with rotary tooth wheels 901 and 901' of the chain sprocket 90 assembled on the shaft pipe 3a.

The differential tooth wheel 608, which is engaged with the driving tooth wheel 607 of the circular disks 601 and 601' eccentrically installed on the main shaft 10a, is installed on a front wheel 14a, such that when the pedals 70 and 70' are driven in a forward direction, the distance between the crank shafts 50 and 50' which are slidingly assembled on the slide pipes 80 and 80' and the pedals 7 and 7' is extended at its maximum. On the other hand, when the pedals 70 and 70' are driven to the rear wheel 15, the length of the crankshafts 50 and 50' is reduced to its original length.

Preferably, a cover C is assembled on the reentrant portions 602 and 602' of the circular disks 601 and 601' to thereby protect the main shaft 10a, the driving tooth wheel 607 and the differential tooth wheel 608.

Figure 9A:
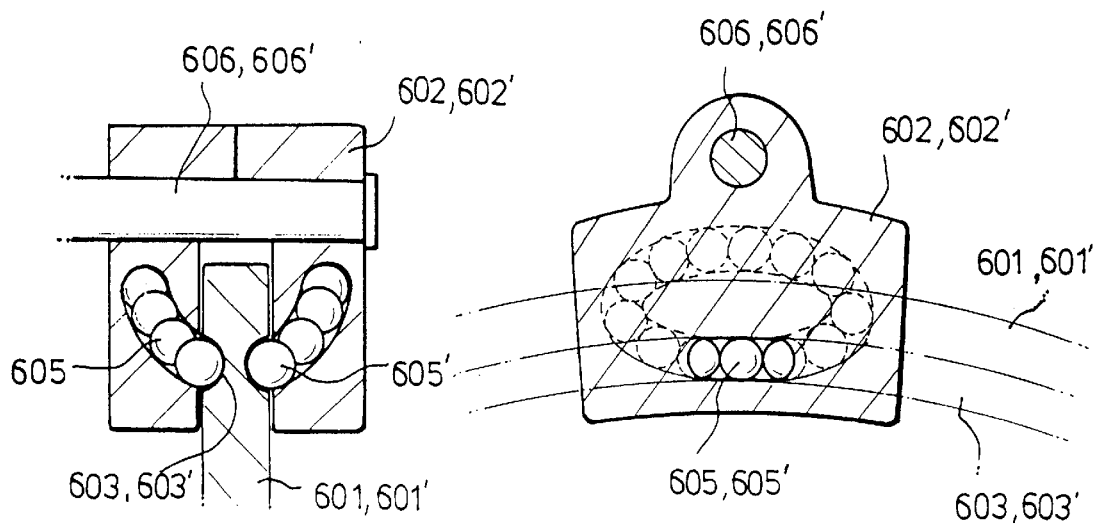
FIGS. 9A and 9B are sectional views illustrating main parts of FIG. 6.
Figure 9B:
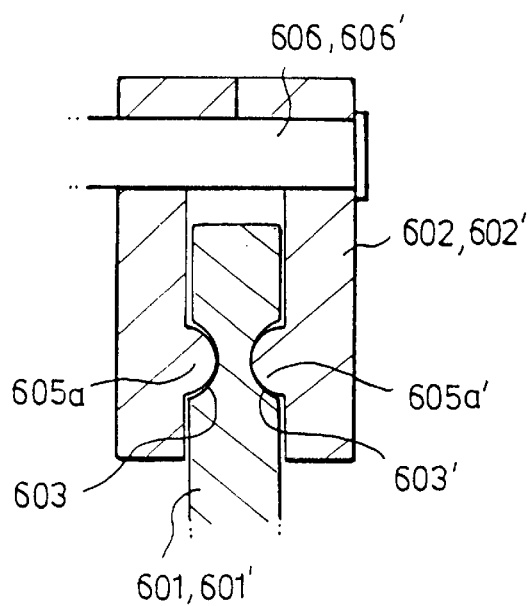

The ball bearings 605 and. 605' installed on the interior of the guide members 604 and 604' are embodied in various assembling manners, as shown in FIGS. 9A and 9B. Firstly, as shown in FIG. 9A, a plurality of ball bearings 605 and 605' are installed on the guide members 604 and 604', such that they are slidingly assembled in a circulated manner on the guide reentrant holes 603 and 603'. On the other hand, as shown in FIG. 9B, slide protrusions 605a and 605a' are formed as a unitary body on the guide members 604 and 604', such that they are slidingly assembled on the guide reentrant holes 603 and 603'.

In the first and second embodiments of the present invention, reference numerals 92 and 902 each designate bearings which are used to rotatably install the chain sprockets 9 and 90 on the shaft pipes 3 and 3a.

Under the above construction, if the pedals 7 and 7' are driven, the distance between the pedals 7 and 7' and the crankshafts 5 and 5' is extended, to thereby achieve an optimal running energy. Now, an explanation of an operation of the variable pedal driving device constructed according to the first embodiment of the present invention will be in detail discussed hereinafter.

In operation, if the pedals 7 and 7' are driven, the crankshafts 5 and 5' are rotated by the rotating force of the pedals 7 and 7'. At the time, the slide pipes 8 and 8' on which the pedals 7 and 7' are assembled are slid along the crankshafts 5 and 5', such that as the rotary radius between the main shaft 10 on which the crankshafts 5 and 5' are installed and the pedals 7 and 7' is varied, it is extended at its maximum when the pedals 7 and 7' are rotated in the forward direction.

In other words, the rotary levers 4 and 4' are assembled on the shaft pipe 3 and are rotated within the same rotary radius centering around the main shaft 10. The pedals 7 and 7' of the slide pipes 8 and 8' assembled on the front sides of the rotary levers 4 and 4' are rotated centering around the rotary shafts 61 and 61' on which the crankshafts 5 and 5' are installed, such that the distance between the rotary shafts 61 and 61' and the pedals 7 and 7' is extended at its maximum to thereby obtain an optimal running energy, when the pedals 7 and 7' are rotated in the forward direction.

In more detail, if the pedals 7 and 7' are rotated in the forward direction, the slide pipes 8 and 8' on which the pedals 7 and 7' are assembled are guided to the crankshafts 5 and 5' assembled on the slide holes 81 and 81' and are then driven toward the forward direction. At the time, since the rotary shafts 61 and 61' are fixedly installed on the rear wheel 15, the slide pipes 8 and 8' are guided by the rotary levers 4 and 4' and are extended at its maximum on a point where the main shaft 10 is passed.

The rotary shafts 61 and 61' of the crankshafts 5 and 5', which are rotated by the driving force of the pedals 7 and 7', enable the driving tooth wheels 62 and 62' within the cases 65 and 65' to be rotated, thus to rotate the differential tooth wheels 63 and 63' connected by means of the chain 67 and 67' with the driving tooth wheels 62 and 62'.

The differential tooth wheels 63 and 63' are assembled on the both ends of the main shaft 10 to transmit the driving force of the pedals 7 and 7' to the rear wheel 15, and the driven tooth wheel 11 mounted on the coaxial line on the differential tooth wheel 63' allows the rotary tooth wheel 12 of the chain sprocket 9 connected by the chain 16 to be rotated, such that the chain sprocket 9 is rotated to thereby drive the rear wheel 15 connected by means of the chain 16 with the chain sprocket 9.

The rotary radius between the crankshafts 5 and 5' and the pedals 7 and 7' is extended during the driving of the pedals 7 and 7' in the forward direction to thereby obtain an optimal running energy.

Now, an explanation of an operation of the variable pedal driving device constructed according to the second embodiment of the present invention will be in detail discussed hereinafter.

In operation, if the pedals 70 and 70' are driven, the rotary radius centering around the main shaft 10*a* of the crankshafts 5 and 5' on which the pedals 7 and 7' are slidingly assembled is varied to thereby achieve optimal running energy.

In other words, if the pedals 70 and 70' are driven, the slide tubes 80 and 80' into which the pedals 70 and 70' are assembled are coupled on the circular disks 601 and 601' by means of the hinge shafts 66 and 66', such that they are guided to the circular disks 601 and 601' eccentrically installed on the main shaft 10*a*. As a result, when the pedals 70 and 70' are driven in the forward direction, the rotary radius of them can be extended at its maximum.

In more detail, if the pedals 70 and 70' are rotated in the forward direction, the slide pipes 80 and 80' on which the pedals 70 and 70' are assembled enable the guide members 604 and 604' on the hinge shafts 606 and 606' to be rotated along the guide reentrant holes 603 and 603' of the circular disks 601 and 601' eccentrically assembled on the main shaft 10*a*. When the guide members 604 and 604' are driven in the forward direction centering around the main shaft 10*a* by the driving force of the pedals 70 and 70', the distance between the pedals 70 and 70' and the main shaft 10*a* can be extended at its maximum.

Therefore, when the pedals 70 and 70' on the guide members 604 and 604' slidingly assembled on the circular disks 601 and 601' are driven from a most upper dead point to a most lower dead point, the distance between the crankshafts 50 and 50' on which the pedals 70 and 70' are slidingly assembled and the main shaft 10*a* is extended at its maximum to thereby achieve an optimal driving energy.

The crankshafts 50 and 50' are rotated by the driving force of the pedals 70 and 70', to thereby rotate the driving tooth wheel 607 on the main shaft 10*a*. Then, the rotating force of the driving tooth wheel 607 is transmitted to the differential tooth wheel 608 and the driven tooth wheel 609 installed on the coaxis of the differential tooth wheel 608. Finally, the rotating force of the tooth wheels 608 and 609 is transmitted to the rotary tooth wheel 901, such that the chain sprocket 90 is rotated and the rear wheel 15 connected by means of the chain 16 with the rotated chain sprocket 90 is thus driven.

INDUSTRIAL APPLICABILITY

As apparent from the foregoing, a variable pedal driving device of a bicycle constructed according to the present invention can extend at its maximum the rotary radius between pedals, rotary shafts of cases as a main driving shaft of a rotating force and a main shaft of circular disks to transmit the extended maximum rotary radius to a rear wheel, when the pedals are driven in a forward direction, thus to obtain an optimal driving energy at the expense of a minimum physical energy consumption.

What is claimed is:

1. A variable pedal driving device comprising:
   a chain sprocket mounted on a main shaft, the chain sprocket being engageable with a chain to drive a driving wheel;
   a first power transmission unit disposed to one side of the chain sprocket, the first power transmission unit including a first disk eccentrically mounted on the main shaft;
   a second power transmission unit disposed on a side of the chain sprocket opposite to the first power transmission unit, the second power transmission unit including a second disk eccentrically mounted on the main shaft;
   a first crankshaft coupled to the main shaft;
   a first slide element slidably mounted on the first crankshaft;
   a first guide member operatively connected to the first slide element, the first guide member being translatable along a periphery of the first disk;
   a first pedal operatively connected to the first slide element and slidable with said first slide element;
   a second crankshaft coupled to the main shaft;
   a second slide element slidably mounted on the second crankshaft;
   a second guide member operatively connected to the second slide element, the second guide member being translatable along a periphery of the second disk; and
   a second pedal operatively connected to the second slide element and slidable with said second slide element.

2. The variable pedal driving device of claim 1, wherein the first power transmission unit includes:
   a driving tooth wheel mounted on the main shaft between the first crankshaft and the chain sprocket and coupled with the first crankshaft for rotation therewith; and
   a differential tooth wheel having gear teeth engaged with gear teeth of the driving tooth wheel.

3. The variable pedal driving device of claim 2, wherein the first power transmission unit includes:

a driven tooth wheel disposed between the first disk and the chain sprocket, the driven tooth wheel being coaxially mounted with the differential tooth wheel for rotation with the differential tooth wheel; and a rotary tooth wheel mounted on the main shaft for rotation with the chain sprocket, the rotary tooth wheel having gear teeth engaging gear teeth of the driven tooth wheel.

4. The variable pedal driving device of claim 1, wherein the first disk has a generally circular peripheral edge.

5. The variable pedal driving device of claim 1, wherein the first slide element is pivotably coupled to the first guide member, and the first pedal is pivotably coupled to the first slide element.

6. The variable pedal driving device of claim 5, wherein the second slide element is pivotably coupled to the second guide member, and the second pedal is pivotably coupled to the second slide element.

7. The variable pedal driving device of claim 1, wherein the first guide member includes projections which are engageable with grooves on either side of the first disk to enable translation of the first guide member along the periphery of the first disk.

8. The variable pedal driving device of claim 1, wherein the first pedal is at its furthest point from the main shaft when the first pedal is driven in a forward direction.

9. A variable pedal driving device comprising:

a chain sprocket mounted on a main shaft, the chain sprocket being engageable with a chain to drive a driving wheel;

a first power transmission unit disposed to one side of the chain sprocket, the first power transmission unit including a first disk eccentrically mounted on the main shaft;

a second power transmission unit disposed on a side of the chain sprocket opposite to the first power transmission unit;

a first crankshaft coupled to the main shaft;

a first pedal operatively connected to the first disk, the first pedal being slidably mounted on the first crankshaft, sliding of the first pedal being effected by eccentric rotation of the first disk about the main shaft;

a driving tooth wheel mounted on the main shaft between the first crankshaft and the first disk for rotation with the first crankshaft;

a differential tooth wheel having gear teeth engaged with gear teeth of the driving tooth wheel;

a driven tooth wheel mounted coaxially with the differential tooth wheel for co-rotation with the differential tooth wheel, the driven tooth wheel being disposed between the chain sprocket and the first disk;

a rotary tooth wheel mounted on the main shaft for co-rotation with the chain sprocket, the rotary tooth wheel having gear teeth engaging gear teeth of the driven tooth wheel;

a second crankshaft coupled to the main shaft; and a second pedal slidably and pivotably coupled to the second crankshaft.

10. The variable pedal driving device of claim 9, wherein the second power transmission unit includes a second disk eccentrically mounted on the main shaft, sliding of the second pedal being effected by eccentric rotation of the second disk about the main shaft.

11. The variable pedal driving device of claim 10, further comprising a second slide element pivotably coupled to the second pedal, the second slide element including an aperture through which the second crankshaft extends and being slidable along the second crankshaft.

12. The variable pedal driving device of claim 11, further comprising a second guide member, the second guide member being pivotably coupled to the second slide element and being translatable along a periphery of the second disk.

13. The variable pedal driving device of claim 9, further comprising a first slide element pivotably coupled to the first pedal, the first slide element including an aperture through which the first crankshaft extends and being slidable along the first crankshaft.

14. The variable pedal driving device of claim 13, further comprising a first guide member, the first guide member being pivotably coupled to the first slide element and being translatable along a periphery of the first disk, the first guide member including projections which are engageable with grooves on either side of the first disk to enable translation of the first guide member along the periphery of the first disk.

15. The variable pedal driving device of claim 9, wherein the first disk has a generally circular peripheral edge.

16. The variable pedal driving device of claim 9, wherein the first pedal is at its furthest point from the main shaft when the first pedal is driven in a forward direction.

* * * * *